US005539823A

United States Patent [19]
Martin

[11] Patent Number: 5,539,823
[45] Date of Patent: Jul. 23, 1996

[54] SUBSCRIPTION TELEVISION PICTURE SCRAMBLING AND DESCRAMBLING SYSTEM PROVIDING COMPATIBILITY WITH DIFFERENT SUCH SYSTEMS

[75] Inventor: Thomas F. Martin, Richardson, Tex.

[73] Assignee: General Instrument Corporation of Delaware, Hatboro, Pa.

[21] Appl. No.: 281,415

[22] Filed: Jul. 27, 1994

[51] Int. Cl.⁶ .................................................. H04N 7/167
[52] U.S. Cl. ................... 380/20; 380/10; 380/15; 380/17
[58] Field of Search .................. 380/9, 10, 14, 380/15, 17, 20

[56] References Cited

U.S. PATENT DOCUMENTS

| | | | |
|---|---|---|---|
| 3,824,332 | 7/1974 | Horowitz | 380/15 |
| 4,222,068 | 9/1980 | Thompson | 380/15 |
| 4,679,078 | 7/1987 | Wong et al. | 380/15 |
| 4,716,588 | 12/1987 | Thompson et al. | 380/20 |
| 4,815,129 | 3/1989 | Griffin et al. | 380/15 |

Primary Examiner—Bernarr E. Gregory
Attorney, Agent, or Firm—Irwin Ostroff; Edward P. Brandeau

[57] ABSTRACT

Video signal scrambling and descrambling methods and apparatus for a subscription TV system are provided which are compatible with other equipment operating in accordance with pre-existing modes of signal scrambling and descrambling. Coded indicator signals generated in accordance with the invention are inserted into selected lines of video signals before they are scrambled by a previously installed scrambler located at a central office. The scrambled video signals, with indicator signals inserted, are then sent to all subscriber locations within the TV system. At new subscriber locations, descrambling receivers, in accordance with the present invention, detect and decode the indicator signals and in accordance with a new mode of operation properly descramble the video signals. At old subscriber locations, previously installed descrambling receivers ignore the indicator signals and descramble the video signals in accordance with pre-existing modes of operation.

14 Claims, 4 Drawing Sheets

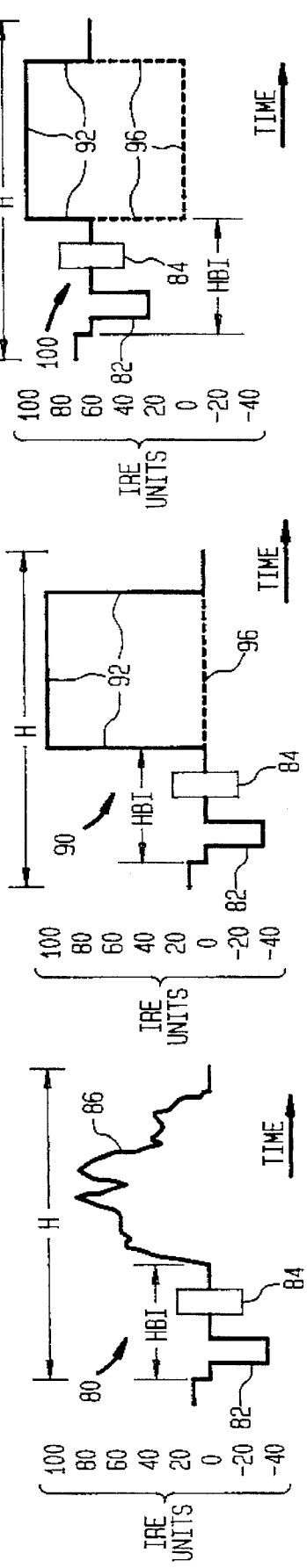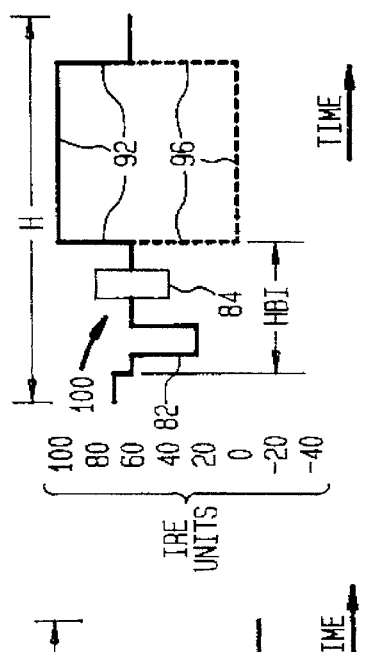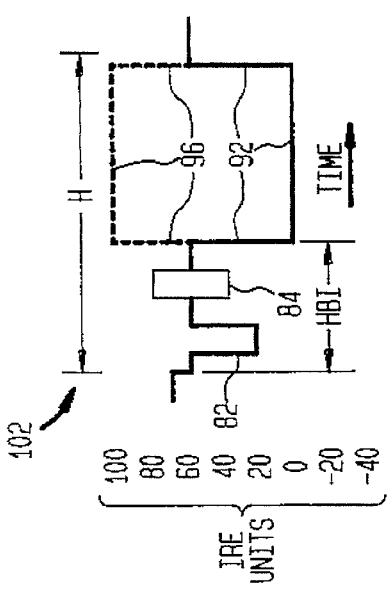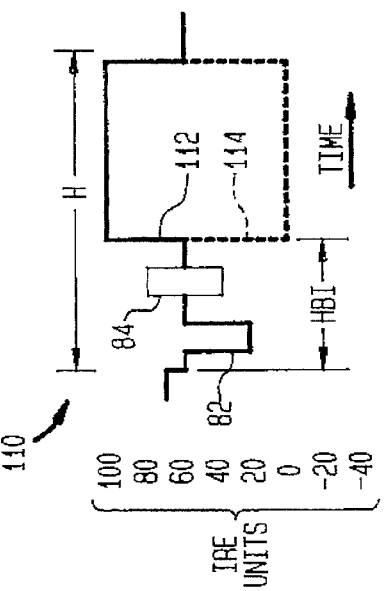

5,539,823

SUBSCRIPTION TELEVISION PICTURE SCRAMBLING AND DESCRAMBLING SYSTEM PROVIDING COMPATIBILITY WITH DIFFERENT SUCH SYSTEMS

FIELD OF THE INVENTION

This invention relates to a scrambling and descrambling method and apparatus for a subscription television system that provides compatibility within the system with other already installed equipment using a different method and apparatus for scrambling and descrambling television pictures.

BACKGROUND OF THE INVENTION

Subscription television systems, such as cable TV, serve customers on a paid subscription basis. There are hundreds of cable TV operations reaching tens of millions of television viewers throughout the United States. A single cable TV system may have thousands of subscribers, each of which pays a monthly service charge, the amount of which depends upon how many and which television channels the subscriber pays to receive. It is necessary therefore for a cable system operator to be able to restrict access on a subscriber-by-subscriber basis to various of the TV channels broadcast within the system. Access by a subscriber to the various channels available in a cable TV system is controlled by means of respective subscriber terminal addresses and access codes sent to each subscriber terminal from a central office over the cable along with the television signals. Each subscriber location is provided by the cable operator with a special subscription TV receiver (subscriber terminal), each with a unique address, that is normally leased to the customer on a monthly basis. The receiver is owned and controlled by the cable TV operator. To prevent non-authorized access to one or more of the many TV channels being simultaneously transmitted over the cable, the cable TV operator typically uses not only subscriber terminal address and channel access codes, but also employs some kind of proprietary coding system for scrambling and descrambling the actual television pictures within each of the channels. Typically, the picture of each TV channel is individually scrambled at a central office at the sending end and then individually descrambled by a special receiver at each subscriber location. Each receiver receives from the central office coded data signals which instruct the respective receiver to descramble (or not) those TV channels for which access is authorized (or not). Thus TV channel access on a subscriber-by-subscriber basis is easily controlled electronically by the cable TV operator from the central office.

There are various scrambling and descrambling systems commercially available to cable TV operators from several manufacturers of such systems. These systems are usually highly proprietary, with certain details of the operation of each being cloaked in secrecy in so far as possible. The scrambling system sold by one manufacturer is generally not compatible with similar systems from other manufacturers. Descrambling equipment is made difficult to copy in order to deter industrial piracy of the equipment or modification thereof to obtain unauthorized access to paid subscription TV channels.

Once a cable TV operator has equipped his system with the scrambling and descrambling equipment made by a first manufacturer, it becomes difficult, if not impossible, for the operator to add equipment from a second manufacturer to that cable TV system because of the problems of compatibility of different scrambling and descrambling methods and apparatus. In effect, the cable TV operator is locked into a one vendor monopoly relation with the first manufacturer. Heretofore a cable operator who does business with one manufacturer and wants to do business with another, has had to re-equip an entire cable TV system with new scrambling and descrambling equipment. This change can be very expensive.

This lack of compatibility between different makes of scrambling and descrambling equipment has been a significant barrier to a manufacturer of new equipment in selling to the many already established cable TV systems. This is true even though the manufacturer may have better prices, produces technically superior equipment to that already in place, has a much stronger industry position, and/or offers additional products and services not available from other manufacturers.

It is desirable therefore for a manufacturer of scrambling and descrambling equipment, without having to face problems of equipment compatibility within an existing cable TV operation, to be able to supply his equipment for new subscribers to the operation as they are added side-by-side with existing subscribers who continue to use different scrambling and descrambling equipment already in place. The present invention provides an economical and highly effective solution to this need by providing a unique scrambling and descrambling system which establishes compatibility between previously installed equipment and modes of operation without the need to modify or control that equipment.

SUMMARY OF THE INVENTION

The present invention, in one of its aspects, provides an overall sync suppression and video inversion (SSAVI) scrambling and descrambling system for subscription television, such as a cable TV system. The invention insures full compatibility with previous scrambling and descrambling equipment already installed throughout a subscription TV system. The previous equipment may have been made by a different or first manufacturer and may operate with a secret, proprietary coding and decoding method not recognized by other equipment. Another or second manufacturer has no control over knowledge of the operation of this equipment. The SSAVI scrambling system provided by the present invention incorporates conventional SSAVI scrambling equipment that is already installed at a central scrambling equipment that is already installed at a central office of a subscription or cable TV operation. This scrambling equipment typically has multiple operating modes, such as sync suppression or not, and video inversion or not, which the scrambling equipment randomly changes from mode to mode to enhance viewing security of the video signal. In accordance with the present invention, there are generated specially coded signals which are then transmitted along with the SSAVI scrambled TV picture and sync signals. At previously existing subscriber locations, the already installed SSAVI descrambling equipment ignores the added coded signals and is able to operate without change in a normal fashion as before. At newly added subscriber locations, new SSAVI descrambling equipment, provided in accordance with the present invention, recognizes the special coded signals and operates to fully descramble the TV signals even though they had been scrambled with otherwise incompatible equipment at the central office.

The special coded signals provided by the present invention comprise a first signal, termed a "flag" signal, and a separate "flag state" signal. The flag "flag" signal is inserted, by way of example, into the video picture portion of a first active horizontal line of each field of a frame of video pictures. The first active horizontal line and the last active horizontal line of each field of a TV picture are normally not viewable on a standard TV receiver and so the "flag" signal, though in fact present in the TV picture itself, is never visually obtrusive. The "flag" signal is inserted into the TV picture before it is scrambled at the central office. Subsequently the "flag" signal is utilized in new descrambling equipment provided by the invention to help determine field-by-field, frame-by-frame whether the picture portion of the video signal has been scrambled (inverted in polarity) at the central office, and then to descramble the video signal accordingly. Where horizontal line sync pulses of the video signals have been suppressed in amplitude at the central office as part of overall scrambling of the video signals, this condition is easily recognized at each subscriber location. The sync pulses, whether suppressed or not, are always in accordance with a predetermined timing pattern set by an industry standard, such as that established by the National Television Standards Committee (NTSC), and suppressed amplitude sync pulses are instantly evident. Then by means of conventional circuitry well known in the art the horizontal sync pulses of the video signals are restored (where needed) to their proper amplitude by the descrambling equipment provided by the invention.

An unvarying or predictable "flag" signal in a line of the video signal would be relatively easy to utilize by someone seeking to gain unauthorized access to a TV channel. Therefore the "flag" signal, before being inserted into the video signal, is changed on a random basis from the equivalent of a binary "1" to a binary "0", then back to a "1", and so on. This makes the "flag" signal for all intents and purposes impossible for an unauthorized person to subsequently utilize.

The "flag state" signal is generated also randomly along with the "flag" signal and both, by way of example, are in-phase originally. Thus the "flag state" signal is a binary "1" when the "flag" signal originally is a binary "1", and is a binary "0" when the "flag" signal originally is a binary "0". The "flag state" signal, by way of example, is transmitted with the video signal as encrypted data and is never inverted in the transmission. The "flag state" data signal (either a "1" or a "0") therefore is received and decoded at subscriber locations in the same phase ("1" or "0") as at the central office before and after the video signals are scrambled. The "flag" signal on the other hand, which is inserted at the central office into a picture portion of a line of the video signal before it is scrambled (inverted), may be received at a subscriber location either in-phase or out-of-phase with the "flag state" signal depending on whether the picture portion of the video lines of a particular field of the TV picture have been scrambled (inverted) or not. By separately detecting the "flag" and the "flag state" signals as received at a subscriber location, and then logically comparing the phases of the two signals, it is immediately known field-by-field and frame-by-frame whether the picture portion of the video signal has been scrambled (inverted) or not. Using the information thus obtained from a logical comparison of the "flag" and "flag state" signals, circuitry in a descrambling receiver provided by the invention fully restores a video picture to its original not scrambled condition.

Viewed from another aspect, the present invention is directed to a video signal scrambling and descrambling system. The system comprises video input means, scrambling means, signaling means, transmission means, and descrambling means. The video input means supplies video signals to be transmitted from a central office to a plurality of subscriber locations. The scrambling means is located at the central office and scrambles video signals according to predetermined modes of scrambling and descrambling. The signaling means generates coded indicator signals and inserts same into selected portions of the video signals from the video input means and applies the video signals with inserted indicator signals to the scrambling means. The transmission means transmits video and indicator signals from the scrambling means at the central office to the subscriber locations. The descrambling means, which is located at a subscriber location and is coupled to the transmission means, detects and decodes the coded indicator signals in the video signals, and under control of decoded indicator signals, descrambles the video signals independently of, and without regard to, the predetermined modes of descrambling and supplies descrambled video signals such that the descrambling means is compatible within the system.

Viewed from still another aspect, the present invention is directed to a method of scrambling and descrambling video signals in a TV system having a central office and a plurality of receiving locations. The method comprises the steps of: providing video signals to be scrambled at the central office; generating coded indicator signals; inserting the indicator signals into selected lines of the video signals before scrambling; scrambling, in accordance with predetermined modes of scrambling and descrambling, the video signals with indicator signals inserted; transmitting the scrambled video signals to a plurality of locations; and descrambling the video signals received at a first location by detecting and decoding the indicator signals to continuously determine whether the video signals have been scrambled or not and using that determination to descramble the video signals independently of the predetermined modes of scrambling and descrambling such that full compatibility in descrambling at different locations with one or more modes of descrambling is provided within the system.

The invention will be better understood from a consideration of the following detailed description given in conjunction with the accompanying drawings and claims.

BRIEF DESCRIPTION OF THE DRAWINGS

FIG. 3 is a schematic illustration of a waveform of one horizontal line of a not scrambled video signal such as illustrated in FIG. 2;

FIG. 4 shows the video signal waveform of FIG. 3 with the picture or active video portion replaced by a "flag" signal of 100 IRE units as shown in solid line, or by a "flag" signal of "0" IRE units as shown in dashed line;

FIG. 5 shows the waveform of FIG. 4 after sync suppression and upward shifting of a horizontal blanking interval (HBI) of the video signal by 70 IRE units, the "flag" signal which previously was 100 IRE units being shown in solid line and the "flag" signal which previously was 0 IRE units being shown in dashed line;

FIG. 6 shows the waveform of FIG. 5 after the active line or picture portion has been scrambled and the "flag" signal inverted, the "flag" signal which previously was 100 IRE units being shown in solid line, and the "flag" signal which previously was 0 IRE units being shown in dashed line;

FIG. 7 shows a waveform of a line of video signal, such as in FIG. 5 or 6, as received at a subscriber location.

DETAILED DESCRIPTION

Figure 1:
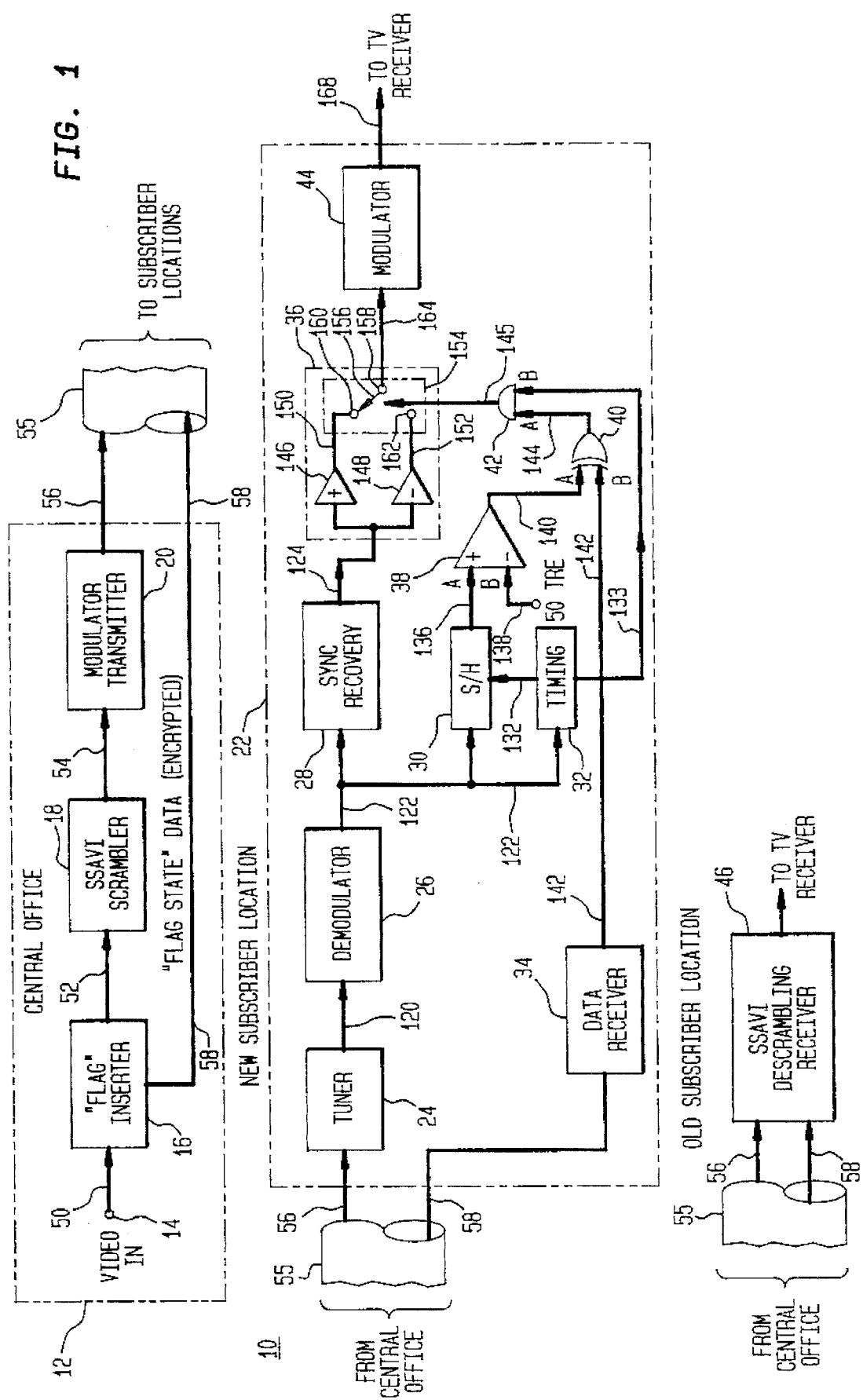
FIG. 1 is a schematic block diagram of a subscription television picture scrambling and descrambling system in accordance with the present invention.

Referring now to FIG. 1, there is shown in schematic block form a TV video signal scrambling and descrambling system 10 in accordance with the present invention. The system 10 is employed, by way of example, in a cable TV operation having a central office and a number of subscriber locations, only one new subscriber location and only one old subscriber location are shown for the sake of simplicity. All of the subscriber locations are typically connected to the central office by a coaxial cable or cables.

Located at the central office is electronic scrambling equipment 12 (shown within a large dashed-line rectangle) in accordance with one aspect of the invention. The equipment 12 comprises an input 14 for a standard video signal, a "flag" inserter 16, a conventional SSAVI (sync suppression and video inversion) scrambler 18, and a conventional modulator transmitter 20.

Installed at a new subscriber location as part of the overall system 10 is a video signal descrambling receiver 22 (shown within a large dashed-line rectangle) in accordance with another aspect of the invention. The receiver 22 comprises a tuner 24, a demodulator 26, a sync recovery unit 28, a sample and hold (S/H) unit 30, a timing unit 32, a "flag state" data receiver 34, a video signal re-inverter unit 36 (shown within a dashed-line rectangle), a comparator 38, an "exclusive-or" logic gate 40, an AND gate 42, and a modulator 44.

Installed at an old subscriber location is a conventional descrambling receiver 46 operating with full compatibility within the scrambling and descrambling system 10 provided by the invention. The receiver 46, by way of example, may be identical to a "decoder" (descrambling receiver) shown in FIG. 10 of U.S. Pat. No. 4,222,068. Such a decoder is intended to operate in accordance with predetermined modes of scrambling and descrambling, together with an "encoder" such as shown in FIG. 4 of this patent. Details and operation of the conventional SSAVI scrambler 18 and the modulator transmitter 20, are disclosed in the aforesaid U.S. Pat. No. 4,222,068 which is incorporated herein by reference.

Video signals, in a standard format which will be described shortly, applied to the input 14 of the electronic scrambling equipment 12 are transmitted via a lead 50 to the "flag" inserter 16. The "flag" inserter 16 internally generates a "flag" or indicator signal and inserts it, as will be described in greater detail hereinafter, into a particular active line of the video signal. An output video signal with "flag" signal of flag inserter 16 is applied via a lead 52 to an input of the SSAVI scrambler 18. A SSAVI scrambled video output signal is applied by the scrambler 18 via a lead 54 to an input of the modulator transmitter 20 whose output is applied to a transmission cable 55 having a TV signal path 56 (i.e., a separate transmission frequency) within the cable. It is to be understood that there are as many signal paths like the path 56 within the cable as there are TV channels being broadcast by the cable TV operation to the subscriber locations.

At the same time that the "flag" inserter 16 is generating a "flag" signal and inserting it into the video signal (as will be described graphically hereinafter), the "flag" inserter 16 also internally generates a "flag state" signal, which, by way of example, is a binary "1" when the "flag" signal is equivalent to a binary "1", and is a binary "0" when the "flag" signal is equivalent to a binary "0". In other words, the "flag" and the "flag state" signals are generated together and are randomly varied in-phase with each other. The "flag" inserter 16, in accordance with another aspect of the invention, encrypts the "flag state" signal, whether a "1" or a "0" as a multi-digit highly secure binary code, and applies the coded signals as encrypted "flag state" data to a signal path 58 of the cable 55. This path 58 is shown, by way of illustration here, as being separate from the video signal path 56. But it will be readily understood by those skilled in the art, that the signal path 58 for the "flag state" data can easily be made a part of the video signal path 56. By encrypting the "flag state" signal as secure coded data the scrambling and descrambling system 10 is highly protected against unauthorized access to the TV channels being broadcast by the cable TV operation.

Figure 2:
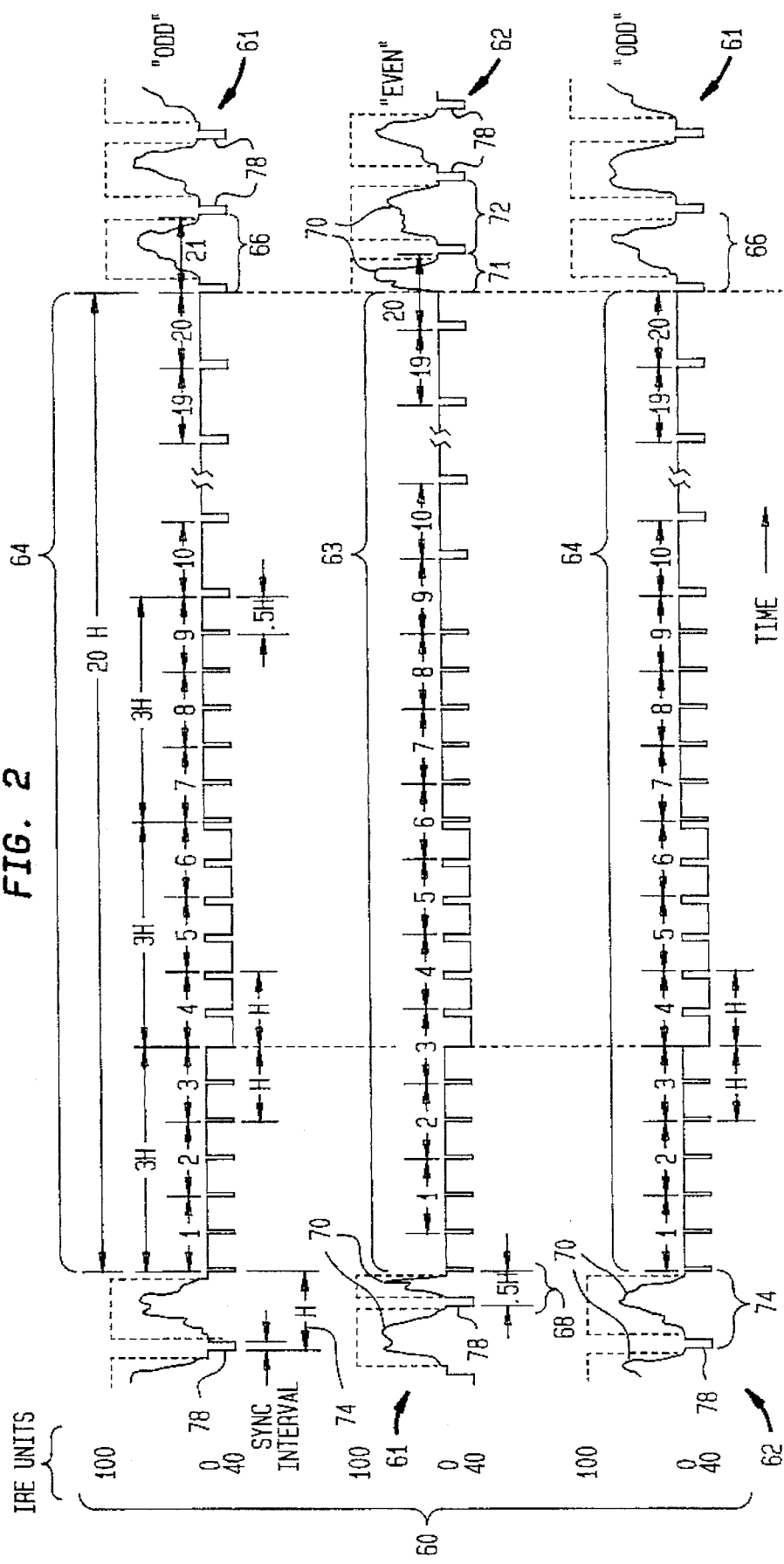
FIG. 2 is a schematic diagram of TV video signals provided in accordance with a NTSC standard.

Referring now to FIG. 2, there is shown somewhat schematically and not necessarily to scale, and by way of background explanation, television signals indicated at 60 which are in accordance with the NTSC standard. A much more complete discussion of such television signals is given in a book by Bernard Grob entitled *Basic Television and Video Systems*, published by McGraw-Hill, Inc., Fifth Edition, 1984. Time is shown along a horizontal axis and relative signal amplitude in IRE units is along a vertical axis. The signals 60 are displayed sequentially line-by-line as an "odd" field indicated at 61, an "even" field indicated at 62, and an "odd" field at 61, and so on. It is noted that only the beginning and ending portions of the "odd" and "even" fields are shown here. The end of an "odd" field 61 and a next "even" field 62 are separated by a "vertical blanking" interval indicated at 63, and the end of an "even" field 62 and a next "odd" field 61 are separated by a "vertical blanking" interval 64. Various synchronizing pulses shown during the "vertical blanking" intervals 63 and 64 are well known in the art and are not further described herein.

During each "vertical blanking" interval 63 or 64, twenty horizontal lines "H" (20H) of the video portion of the signal 60 are blanked out. This provides time for vertical retrace from the end of one field to the beginning of the next, and so on. There are "262 ½" horizontal lines H in each of the fields 61 and 62 for a total of "525" lines in a vertical frame of two fields of the television picture. The frames are repeated 30 times a second, with the two fields thereof repeated at 60 times per second.

Beginning with the twenty-first line H, as indicated at 66 of an "odd" field 61, two hundred forty two full lines of the television signal 60 are displayed, followed by one half of a line H indicated at 68 at the end of an "odd" field 61. The active video portion of the signal 60 during a horizontal line is indicated at 70. At the end of an "odd" field there is another "vertical blanking" interval 63 followed by one-half of the twentieth line H indicated at 71 of the next "even" field 62. This half-line 71 is followed by a full twenty-first line, as indicated at 72, of the "even" field, and so on. Each "even" field ends in a full line, as indicated at 74, and then another "vertical blanking" interval 64 begins. The time duration of a full line H, such as indicated at 66, 72 and 74, is termed "one line time". Each line H is initiated by a horizontal line blanking interval (HBI) including a sync pulse 78 having a very short "sync interval". It is to be noted that the horizontal line sync pulses 78 for each "odd" field are offset by a half line-time with respect to the line sync pulses 78 for an "even" field. Thus an "odd" field 61 ends with a half-line as indicated at 68 and an "even" field 62 begins with a half-line as indicated at 71, and so on. A video signal such as illustrated in FIG. 2 is applied to the video input 14 of the scrambling equipment 12 (FIG. 1).

Referring now to FIG. 3, there is shown enlarged and not exactly to scale, a waveform 80 of a full line "H" of a video signal such as shown for example at 66 or 72 in FIG. 2. Signal amplitude in FIG. 3 is shown vertically in standard IRE units from −40 to 100, a range representing a 1 volt peak-to-peak signal, with "0" IRE being the blanking level, as is well known in the art. A horizontal blanking interval (HBI) is as indicated. The waveform 80 has a standard horizontal blanking and sync pulse 82 (like a pulse 78 in FIG. 2), with a standard "color burst" 84, and an active video picture portion 86, all of which are well known in the art.

Referring now to FIG. 4, there is shown a waveform 90 which is similar to the waveform 80 of FIG. 3, but with the active video picture 86 portion replaced by a "flag" signal 92 (shown in solid line) having an amplitude of 100 IRE units. This "flag" signal 92 is equivalent to a binary "1". The waveform 90 with its "flag" signal 92 (not yet scrambled) is applied via the lead 52 (FIG. 1) to the SSAVI scrambler 18. As seen also in FIG. 4, a "flag" signal 96 (shown by a dashed line), which is the equivalent to a binary "0", when inserted into the waveform 90, lies along the "0" IRE level. A binary "1" flag 92 (solid line) is not present when a binary "0" flag 96 (dashed line) is present, and vice versa. As mentioned previously, the "flag" signal is randomly varied between a "1" and "0" by the "flag" inserter 16 to make the presence and identity of a "flag" signal difficult for an unauthorized person to utilize in descrambling the video signal. A "flag" signal, equivalent to either a binary "1" or a binary "0" is inserted, in accordance with the present invention, in a line of active video signal which is subject to being inverted in the SSAVI scrambler 18. (FIG. 1). Thus, a "flag" signal is advantageously inserted in the first video line subject to inversion by the SSAVI scrambler of each field, for example the twenty-fourth line. As mentioned previously, these lines are not normally displayed on the screen of a standard TV receiver.

Referring now to FIG. 5, there is shown a waveform 100 which has been subjected to sync suppression but not video inversion (such as appears on the lead 54 of FIG. 1). The horizontal blanking interval (HBI) of the waveform 100 has in effect been offset upward by 70 IRE units so that the lower tip of the sync pulse 82 now has a level of 30 IRE (compare with waveform 90 of FIG. 4). The "flag" signal 92 (a "1") has a level of 100 and the "flag" signal 96 (a "0") has a "0" IRE level. Neither "flag" has been inverted.

Referring to FIG. 6, there is shown a waveform 102 (such as also appears on the lead 54 of FIG. 1) in which the "flag" signal of FIG. 5 is inverted (and the HBI shifted). Thus, if the "flag" were originally a binary "1", it is inverted in the waveform 102 as the "flag" signal 92 (solid line) with a "0" IRE level. Conversely, if the "flag" were originally a binary "0", it is inverted in the waveform 102 as the "flag" signal 96 (dashed line) with a 100 IRE level. One or the other of the "flags" 92 or 96 (but not both) is present in the waveform 102. It is not possible to tell merely by the level alone of a "flag" signal (either "0" IRE or 100 IRE) whether the picture portion of the video signal has been inverted since the "flag" signal is randomly varied between binary "0" and "1" prior to insertion into the video signal, as was previously explained. Thus, because "flag" signals are randomly inverted by the flag inserter 16 prior to being inserted into the video signals, and are then again randomly inverted or not along with the picture portions of the video signals by the scrambler 18, the phase or level (0 or 100 IRE) of a "flag" signal as received at a subscriber location cannot by itself alone be used to determine whether the picture portion of the video signal has been inverted or not.

Referring now to FIG. 7, there is shown a video waveform 110 (similar to the waveform 100 or the waveform 102) as received over the signal path 56 at a subscriber location (FIG. 1). The waveform 110 has a "flag" signal 112 shown in solid line with a 100 IRE level. Alternatively, the waveform has a "flag" signal 114, shown in dashed line with a "0" IRE level. The waveform 110 has its sync portion (occurring during HBI) suppressed.

Referring again to FIG. 1, the electronic descrambling equipment 22 receives over the TV cable 55 video signals via the signal path 56, and receives "flag state" signals as encrypted data on the signal path 58. The video signal may be sync suppressed with the picture portion inverted or not as illustrated by the waveform 110 (FIG. 7). Of course, where the sync is not suppressed by the scrambler 18, the sync level will be as shown in FIG. 4. The video signals on signal path 56 are applied to an input of the tuner 24 (which is well known in the art), which selects any one of the TV channels being broadcast and then applies via a lead 120 the video signal of a selected channel to the demodulator 26 (which is also well known). The demodulator 26 applies from an output thereof a demodulated video signal of a selected TV channel via a common lead 122 to an input of the sync recovery unit 28, to the sample and hold (S/H) unit 30, and to the timing unit 32. Each of units 28, 30 and 32 can be comprised of circuitry and modes of operation well known in the art.

The sync recovery unit 28 recognizes those portions of the video signal where the horizontal sync pulses have been suppressed, such as illustrated in the waveform 110 (FIG. 7), and automatically restores these pulses to their normal levels, such as illustrated by the waveform 90 (FIG. 4). An output of the sync recovery unit 28 is applied to a lead 124 and is a video signal (such as illustrated in FIG. 2) with standard sync levels restored but where the picture portion of active lines of a field may or may not have been inverted as part of being scrambled. The circuitry and mode of operation of the sync recovery unit 28 are well known in the art.

Video signals from the demodulator 26 are also applied via the lead 122 to inputs of the sample and hold (S/H) unit 30 and the timing unit 32. As will be explained shortly, the timing unit 32, in response to these video signals, generates at precise times occurring within the video signals a "sample and hold" pulse 130 (FIG. 9) and a "gate" pulse 131 (FIG. 10). The timing unit 32 applies the first pulse 130 via a lead 132 to another input of the S/H unit 30 and applies the second pulse 131 via a lead 133 to a "B" input of the AND gate 42. The pulse 130 enables the S/H unit 30 to then determine whether a "flag" signal, such as shown in FIG. 7, has a level of 100 IRE or "0" IRE, as will be explained shortly. The circuitry and modes of operation of the S/H unit 30 and the timing unit 32 are well known in the art.

Figure 8:
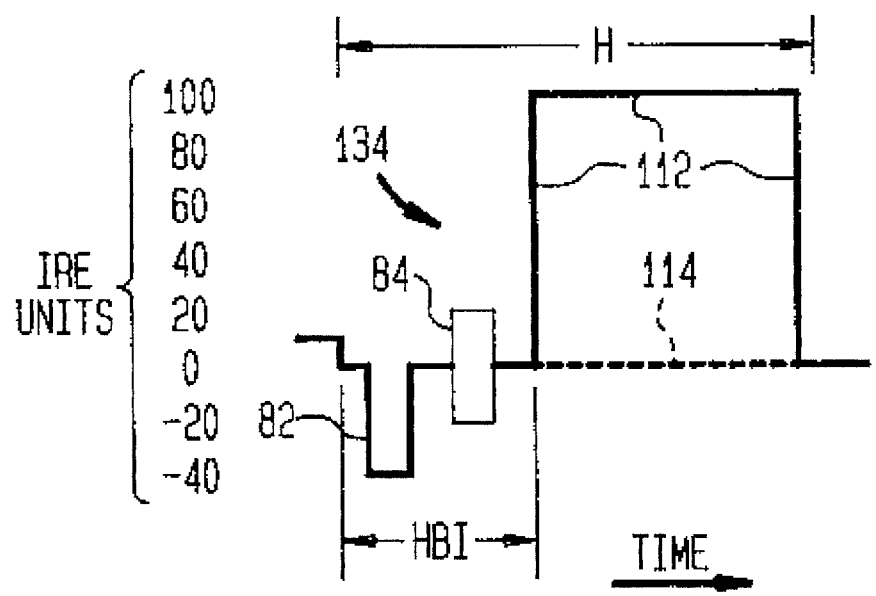
FIGS. 8, 9, and 10 taken together show time relationships of a waveform of a line of video signal (FIG. 8), a "sample and hold" pulse (FIG. 9), and a "gate" pulse (FIG. 10).
Figure 9:
Figure 10:
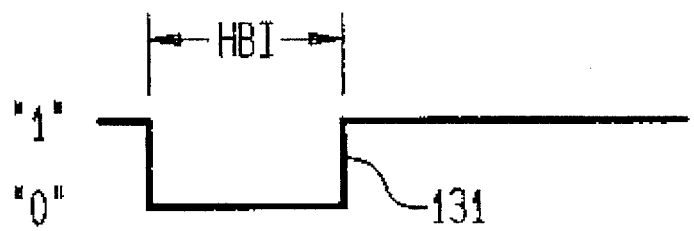

Referring now to FIGS. 8, 9, and 10, there are shown the time relationship of a "sample and hold" pulse 130 (FIG. 9), and of a "gate" pulse 131 (FIG. 10) with respect to a waveform 134 (FIG. 8). The waveform 134 (such as appears on the lead 124 of FIG. 1) is similar to the waveform 110 (FIG. 7) with "flag" signals 112 or 114, but has its sync portion including the pulses 82 and 84 restored to standard IRE levels such as shown by the waveform 90 (FIG. 4). It is noted that there is a common horizontal time axis for the FIGS. 8, 9, and 10. Thus it is seen that a time duration 135 of the "sample and hold" pulse 130 (FIG. 9), which is generated by the timing unit 32 (FIG. 1) and applied to the lead 132 as a binary "1", is generally centered within and less than the time duration of the "flag" signal 112 (solid line), or the alternative "flag" signal 114 (dashed line), of the waveform 134. Accordingly, when a "sample and hold" pulse 130 with a binary "1" level occurs, there is a "flag" signal level either at 100 IRE or "0" IRE in the line video signal waveform 134. It is further noted that the duration of the "gate" pulse 131 of FIG. 10 (as applied to the lead 133) is congruent with the horizontal blanking interval (HBI) of the waveform 134 of FIG. 8. During the HBI, the "gate" pulse 131 has a "0" binary level, and a binary "0" is applied via the lead 133 to the B input of the AND gate 42. At other times when no pulse 131 is present, a binary "1" is maintained on the lead 133.

Referring again to FIG. 1, the output of the S/H unit 30 of the descrambling equipment 22 has a signal level of 100 IRE when the "flag" signal being sampled during the pulse 130 (FIGS. 8 and 9) has a level of 100 IRE, and has a level of "0" IRE when the "flag" signal is "0" IRE. The output of the S/H unit 30 is applied via a lead 136 to an "A" input of the comparator 38. A "B" input of the comparator 38 has applied to it via a lead 138 a steady-state level of 50 IRE. When the "A" input of the comparator 38 is at 100 IRE, the output of the comparator 38 is a binary "1". When the input "A" is at "0" IRE, the output of the comparator is a binary "0". An output of the comparator 38 is applied via a lead 140 to an "A" input of the "exclusive-or" logic gate 40. A "B" input of the gate 40 is connected via a lead 142 to an output of the data receiver 34. The receiver 34 decodes the "flag state" data applied to an input thereof from the signal path 58 and applies at the output thereof and on the lead 142 a binary level ("1" or "0") corresponding in phase with the "flag state" signal originally generated by the "flag" inserter 16.

An output of the "exclusive-or" gate 40 (either a binary "1" or "0") is applied via a lead 144 to an "A" input of the AND gate 42. An output of the AND gate 42 is applied via a lead 145 to the video signal re-inverter unit 36, which is well known in the art and is schematically shown here. Video signals on the lead 124 are applied to inputs of a non-inverting (+) amplifier 146 and an inverting (-) amplifier 148 of the unit 36. Outputs of amplifiers 146 and 148 are applied respectively by a lead 150 and a lead 152 to a reversing switch 154 (shown schematically within a dashed line rectangle). The switch 154 has a contact arm 156 which is permanently connected to a center terminal 158 and is selectively connected to an upper terminal 160 connected to the lead 150 or to a lower terminal 162 connected to the lead 152. As shown, arm 156 is connected to terminal 160. The switch 154 is electronically controlled by binary signals applied via the lead 145 to the unit 36. When a binary "0" is applied to the lead 145, the switch arm 156 is actuated to the upper position (that shown) to connect the output of the non-inverting (+) amplifier 146 via the lead 150 and the terminal 160 to the output terminal 158. When a binary "1" is applied to the lead 145, the switch arm 156 is actuated to its lower position to connect the output of the inverting (-) amplifier 148 via the lead 152 and the lower terminal 162 to the output terminal 158. The output terminal 158 of the switch 154 is connected via a lead 164 to an input of the modulator 44 whose output is applied via a lead 166 to a standard TV receiver (not shown). As will be explained presently, the switch 154 is logically controlled so that the HBI portion of a line of the video signal (FIG. 8) is never inverted. In other words, the switch 154 always selects the non-inverting (+) amplifier 146 during the HBI portion of the video signal.

When the same binary levels (either "1's" or "0's") are simultaneously present at the output lead 140 of the comparator 38 and on the lead 142 from the data receiver 34, and are applied to the inputs of the "exclusive-or" gate 40, the output of the gate 40 is a binary "0". It is then known from this output "0" that the "flag" signal of a video waveform, such as the waveform 134 shown in FIG. 8, has not been inverted by the SSAVI scrambler 18 at the central office. When a binary "0" is applied to the lead 140, the subsequent active picture lines of a video field then being received are not re-inverted. The video signals on the lead 24 are passed without being inverted through the non-inverting (+) amplifier 146 of the unit 36 through the switch 156 to the modulator 44. The modulator 44 then applies the fully descrambled video signals in standard TV broadcast format to a TV receiver, as indicated.

Conversely, when the binary levels at the "A" and "B" inputs of the "exclusive-or" gate 40 are opposite to each other, one being a "0" and the other a "1" the output of the gate 40 on the lead 144 is a binary "1". This then indicates that the "flag" signal, such as shown in FIG. 8, is inverted by the SSAVI scrambler 18 along with the subsequently following active picture lines of a video field. A binary "1" from the "exclusive-or" gate 40 is then applied via the lead 144 to the A input of the AND gate 42. As seen in FIG. 10, the timing unit 32 generates a pulse 131 with binary "0" level and applies it to the lead 133 only during the HBI portion of a line of the video signal. During the remainder of the time a binary "1" level is maintained on the lead 133 and at the B input of the AND gate 42. Thus a binary "1" on the lead 144 (indicating "flag" inversion) will, during an active picture portion only of a video signal, actuate the switch arm 156 of the switch 154 to its lower position. This then connects the inverted picture portions of the video signals on the lead 124 through the inverting (-) amplifier 148 to the output terminal 158 and thence to the modulator 44. And as before, the modulator 44 applies via the lead 166 a fully descrambled video signal in TV broadcast format to a TV receiver.

The descrambling receiver 46 (described previously) is shown as part of the overall scrambling and descrambling system 10 to illustrate the full compatibility of old and new descrambling equipment within the system 10. The receiver 46 does not utilize the "flag" and "flag state" signals provided in accordance with an aspect of the present invention and instead functions according to the predetermined modes of operation established by the SSAVI scrambler 18 to fully descramble the video signals applied to it via the signal path 56. Descrambled TV pictures are then applied by the receiver 46 to a TV receiver, as indicated.

Various modifications in the apparatus and method disclosed may occur to those skilled in the art and can be made without departing from the spirit and scope of the invention as set forth in the accompanying claims. For example, the invention is not limited to use only with the particular SSAVI scrambler and descrambler which are disclosed. Moreover, transmission media other than a TV cable may be used, and TV signals other than in NTSC format may be employed. Still further, the special coded signals provided by an aspect of the invention are not restricted to the IRE levels shown, and encoding and decoding of the signals may be accomplished differently from the way given above. Furthermore, cable 55 can be replaced by wireless communication means.

What is claimed is:

1. A video signal scrambling and descrambling system comprising:

video input means for supplying video signals to be transmitted from a central office to a plurality of subscriber locations at which may be located previously installed subscriber equipment;

scrambling means located at the central office for scrambling video signals according to predetermined modes of scrambling and a proprietary code for descrambling previously installed subscriber equipment operating in accordance with the proprietary code for descrambling;

signaling means for generating separately coded indicator signals and for inserting same into selected portions of the video signals from the video input means and for applying the video signals with inserted indicator signals to the scrambling means;

transmission means for transmitting video and indicator signals from the scrambling means at the central office to the subscriber locations; and descrambling means, which is located at a subscriber location and is coupled to the transmission means, for detecting and decoding the separately coded indicator signals in the video signals, and under control of decoded indicator signals, for descrambling the video signals and for supplying descrambled video signals such that the descrambling means is compatible within the system along with previously installed subscriber equipment at other locations operating in accordance with the proprietary code for descrambling.

2. The system of claim 1 wherein the signaling means generates a flag signal and a flag state signal, the flag signal being inserted into the video signals, and the flag state signal being sent as coded data to the subscriber locations.

3. The system of claim 1 wherein:

the scrambling means comprises a sync suppression and video inversion scrambler which operates in accordance with predetermined modes of operation to suppress sync pulses and to invert picture portions of lines of the video signals; and the descrambling means is a receiver which restores suppressed sync pulses to standard levels and detects and decodes the Separately coded indicator signals and in response thereto re-inverts picture portions of lines of the video signals to fully descramble the video signals.

4. Scrambling and descrambling apparatus for a subscription TV system comprising:

scrambling means located at a central office for scrambling video signals according to predetermined modes of sync suppression and video inversion (SSAVI) of the video signals;

input means for supplying video signals in an industry standard format, the video signals to be scrambled at a central office and transmitted to a plurality of subscriber locations;

signaling means for generating coded indicator signals and for inserting selected ones of them into the video signals from the input means and for applying the video signals with inserted indicator signals to the scrambling means;

transmission means for transmitting scrambled video and indicator signals from the central office to the subscriber locations;

first receiver means, which is located at a first subscriber location and is coupled to the transmission means, for descrambling the video signals in accordance with the predetermined SSAVI modes of operation of the scrambling means and for thereupon supplying descrambled video signals; and second receiver means, which is located at a second subscriber location and is coupled to the transmission means, for restoring to standard levels sync portions of the video signals and for detecting and decoding the coded indicator signals and under control thereof for re-inverting inverted picture portions of the video signals such that the second receiver means operates with full compatibility within the TV system side-by-side with the first receiver means.

5. The apparatus of claim 4 wherein:

the scrambling means includes a SSAVI scrambler previously installed in the TV system;

the first receiver means being a receiver previously installed in the TV system; and the second receiver means comprises a sync recovery unit for restoring video sync levels to standard values, a video re-inversion unit for re-inverting picture portions of the video signals, and logic means responsive to decoded indicator signals for controlling the re-inversion unit to re-invert inverted picture portions of the video signal such that a fully descrambled video signal is obtained at an output of the second receiver means.

6. Scrambling and descrambling apparatus for a subscription TV system comprising:

video signal scrambling equipment located at a central office;

transmission means for transmitting scrambled video signals from the central office to a plurality of subscriber locations;

a plurality of descrambling receivers coupled to the transmission means at respective subscriber locations;

the video signal scrambling equipment comprising:

a video input for standard video signals;

flag signal generating means, which is coupled to the video input, for generating and inserting coded flag signals into selected lines of the video signals;

a video signal scrambler, which is coupled to the flag signal generating means, for sync suppressing and video inverting (SSAVI) the video signals having flag signals inserted prior to scrambling, the scrambler operating in accordance with predetermined modes of operation; and modulator transmitter means, which is coupled to the scrambler, for applying scrambled video signals in broadcast TV format to the transmission means;

a first of the plurality of descrambling receivers comprising:

a SSAVI descrambler operating in accordance with the predetermined modes of operation to descramble the video signals and to generate TV signals in standard format for display on a TV receiver; and a second of the plurality of descrambling receivers comprising:

a standard tuner demodulator coupled to the transmission means for supplying video signals in SSAVI scrambled form;

a sync recovery unit, which is coupled to the tuner demodulator, for automatically restoring suppressed sync pulses to standard sync levels;

a signal re-inverter unit for re-inverting inverted picture lines of the scrambled video signals;

logic means for detecting and decoding the flag signals so as to determine therefrom whether picture lines of the scrambled video signals have been inverted, the logic means being coupled to the re-inverter unit and controlling same to re-invert the inverted picture lines to produce a fully descrambled video signal; and modulator means, which is coupled to the re-inverter unit, for generating descrambled TV signals in standard format for display on a TV receiver.

7. The apparatus of claim 6 wherein:

the flag signal generating means generates along with the flag signals flag state signals which the generating means encrypts as coded flag state data and applies to the transmission means; and the logic means detects and decodes flag state data and compares the flag and the flag state signals to determine whether video signals have been inverted.

8. A method of scrambling and descrambling video signals in a TV system having a central office and a plurality of receiving locations, the method comprising the steps of:

providing video signals to be scrambled at the central office;

generating coded indicator signals;

inserting the indicator signals into selected lines of the video signals before scrambling;

scrambling, in accordance with predetermined modes of scrambling and proprietary code for descrambling, the video signals with indicator signals inserted;

transmitting the scrambled video signals to a plurality of locations; and descrambling the video signals received at a first location by detecting and decoding the indicator signals to continuously determine whether the video signals have been scrambled or not and using that determination and not the proprietary code to descramble the video signals such that full compatibility in descrambling at different locations with one or more codes for descrambling is provided within the system.

9. A method of scrambling and descrambling video signals for a subscription TV system, the method comprising the steps of:

providing at a central office input video signals having a standard format;

generating flag signals and flag state signals respectively related to the flag signals;

inserting flag signals into selected lines of the video signal;

scrambling according to predetermined coded modes of scrambling and descrambling the video signals with flag signals inserted;

transmitting from the central office to a plurality of subscriber locations the scrambled video signals and the flag state signals;

receiving at a first subscriber location the scrambled video signals and the flag state signals and detecting each flag signal along with a corresponding flag state signal;

making a comparison of the detected flag and flag state signals to make a logical determination whether portions of the video signal need to be descrambled; and using the logical determination of flag and flag state signals to descramble the video signals such that full compatibility in descrambling video signals at different locations with different codes for descrambling is provided within the TV system.

10. The method of claim 9 wherein the flag signals are inserted into lines of the video signal which are subject to being scrambled, and the flag state signals are transmitted separately from scrambled lines of video signals.

11. The method of claim 10 wherein the video signals are in accordance with a standard set by the National Television Standards Committee (NTSC), and the flag signals are inserted in lines of active video occurring shortly after vertical blanking intervals.

12. The method of claim 11 wherein the flag signals are inserted into the twenty-fourth lines of the video signals.

13. The method of claim 9 wherein the flag signal and the flag state signal are randomly varied to provide added security against unauthorized access to descrambled signals.

14. A method of scrambling and descrambling video signals for a subscription TV system, the method comprising the steps of:

providing at a central office input video signals in an industry standard format;

generating flag signals and flag state signals related to each other, the signals being randomly varied in unison;

inserting flag signals into selected lines of the video signal;

scrambling according to predetermined modes of sync suppression and video inversion (SSAVI) the video signals with flag signals inserted;

transmitting from the central office to a plurality of subscriber locations the scrambled video signals and the flag state signals as coded data;

receiving at a first subscriber location the scrambled video signals and the flag state data and detecting and decoding each flag signal along with a corresponding flag state signal;

making a comparison of the detected flag and flag state signals to logically determine whether portions of the video signal need to be re-inverted;

restoring to standard levels suppressed level sync signals in the received video signals;

using the logical determination of flag and flag state signals to re-invert inverted ones of the received video signals; and receiving at a second subscriber location the scrambled video signals and descrambling them in accordance with the predetermined modes of SSAVI scrambling and descrambling without regard to the flag and flag state signals such that full compatibility in descrambling video signals at different locations with different modes of descrambling is provided within the TV system.

* * * * *